(12) United States Patent
Prosser et al.

(10) Patent No.: US 8,829,851 B2
(45) Date of Patent: Sep. 9, 2014

(54) SINGLE ELECTRIC VEHICLE CHARGER FOR ELECTRICALLY CONNECTING TO MULTIPLE ELECTRIC VEHICLES SIMULTANEOUSLY WHILE AUTOMATICALLY CHARGING THE MULTIPLE ELECTRIC VEHICLES SEQUENTIALLY

(75) Inventors: Ronald Prosser, Brooklyn, NY (US); Stephen M. Burchett, Brooklyn, NY (US)

(73) Assignee: Green Charge Networks LLC, Huntington Beach, CA (US)

( * ) Notice: Subject to any disclaimer, the term of this patent is extended or adjusted under 35 U.S.C. 154(b) by 677 days.

(21) Appl. No.: 13/066,609

(22) Filed: Apr. 19, 2011

(65) Prior Publication Data
US 2012/0013298 A1 Jan. 19, 2012

Related U.S. Application Data

(60) Provisional application No. 61/399,490, filed on Jul. 13, 2010.

(51) Int. Cl.
*H02J 7/00* (2006.01)
*B60L 11/18* (2006.01)

(52) U.S. Cl.
CPC .............. *B60L 11/1844* (2013.01); *Y02T 90/14* (2013.01); *Y02T 90/163* (2013.01); *Y02T 90/16* (2013.01); *Y02T 10/7088* (2013.01); *Y02E 60/721* (2013.01); *H02J 7/0073* (2013.01); *Y04S 10/126* (2013.01); *Y02T 90/128* (2013.01); *Y02T 10/7005* (2013.01)
USPC ............................. 320/109; 320/104; 320/162

(58) Field of Classification Search
CPC ... Y02T 10/7088; Y02T 90/14; Y02T 90/128; Y02E 60/721; Y04S 10/126; B60L 11/1844; H02J 7/0073
USPC .......................... 320/104, 109, 124, 162, 163
See application file for complete search history.

(56) References Cited

U.S. PATENT DOCUMENTS

| 5,323,099 A | 6/1994 | Bruni |
| 5,548,200 A | 8/1996 | Nor |
| 5,594,318 A * | 1/1997 | Nor et al. ...................... 320/108 |
| 5,780,991 A | 7/1998 | Brake |
| 5,803,215 A | 9/1998 | Henze |
| 5,847,537 A | 12/1998 | Parmley |
| 6,081,205 A | 6/2000 | Williams |
| 6,338,450 B1 | 1/2002 | Schwendinger |
| 2008/0218121 A1 | 9/2008 | Gale |

* cited by examiner

*Primary Examiner* — Edward Tso
*Assistant Examiner* — Aaron Piggush
(74) *Attorney, Agent, or Firm* — Richard C. Galati; Holland & Hart LLP (57) ABSTRACT

A single electric vehicle charger for electrically connecting to multiple electric vehicles simultaneously while automatically charging the multiple electric vehicles sequentially. The charger includes an AC to DC rectifier, at least one ground fault circuit interrupter, and at least two physical electrical disconnects. The AC to DC rectifier electrically connects to an AC power source and allows DC batteries of the multiple electric vehicles to be charged from the AC power source. The at least one ground fault circuit interrupter is in electrical communication with the AC to DC rectifier and disconnects whenever current becomes unbalanced between an energized conductor and a return neutral conductor. The at least two physical electrical disconnects are in electrical communication with the at least one ground fault circuit interrupter and isolate the multiple electric vehicles that are electrically connected but are not being charged, with only one physical electrical disconnect being closed at any given instant.

15 Claims, 4 Drawing Sheets

SINGLE ELECTRIC VEHICLE CHARGER FOR ELECTRICALLY CONNECTING TO MULTIPLE ELECTRIC VEHICLES SIMULTANEOUSLY WHILE AUTOMATICALLY CHARGING THE MULTIPLE ELECTRIC VEHICLES SEQUENTIALLY

1. CROSS REFERENCE TO RELATED APPLICATIONS

The instant non-provisional patent application claims priority from provisional patent application No. 61/399,490, filed on Jul. 13, 2010, for a CONTROL SYSTEM FOR ELECTRIC VEHICLE CHARGING SYSTEMS, and incorporated herein by reference thereto.

2. BACKGROUND OF THE INVENTION

A. Field of the Invention

The embodiments of the present invention relate to an electric vehicle charger, and more particularly, the embodiments of the present invention relate to a single electric vehicle charger for electrically connecting to multiple electric vehicles simultaneously while automatically charging the multiple electric vehicles sequentially.

B. Description of the Prior Art

The electric vehicle ("EV") charging industry is coming of age. Currently, there are level 1, 2, and 3 EV chargers that supply a charge at slow, moderate, and quick rates, respectively. Regardless of the level, however, a single charger can only be electrically connected to, and supply charge to, a single EV at a time.

There are several venues where the installation and operation of electric vehicle service equipment ("EVSE") is practical. One such location is a parking garage. In this case, EV owners/operators drive to the garage, and charge their EVs while they are parked in the garage.

As more and more EVs hit the road, more parking garage customers will be driving EVs. Hence, the demand for EVSE in parking garages will increase. In order to successfully charge multiple EVs with a single charger, a parking garage attendant will be needed to orchestrate the process. This person will be responsible for moving the first EV to be charged into the EVSE parking spot, connecting the EV charger to the EV, and activating the charger. Once charging is complete, the attendant will disconnect the EV charger and the EV, move the first EV to a different parking spot, move the second EV to be charged into the EVSE parking spot, and begin the process again.

There is only one alternative to this scenario currently available. Purchasing and installing additional EV chargers will allow customers to self-park and connect their EVs and the EV chargers themselves. Thus, the need for an attendant to shuffle multiple cars through a single charger could be eliminated, and operational costs could be reduced. The cost of additional chargers and installation costs, however, may not be economically feasible. In addition to the cost of multiple chargers, the costs of running multiple conduit and wiring from the electrical panel box to the chargers can add significant cost to installations. Furthermore, if the service to the panel and/or the panel box requires greater electrical capacity, the cost increases dramatically.

Numerous innovations for electric charging devices have been provided in the prior art, which will be described below in chronological order to show advancement in the art, and which are incorporated herein by reference thereto. Even though these innovations may be suitable for the specific individual purposes to which they address, nevertheless, they differ from the embodiments of the present invention in that they do not teach a single electric vehicle charger for electrically connecting to multiple electric vehicles simultaneously while automatically charging the multiple electric vehicles sequentially.

(1) U.S. Pat. No. 5,323,099 to Bruni et al.

U.S. Pat. No. 5,323,099—issued to Bruni et al. on Jun. 21, 1994 in U.S. class 320 and subclass 108—teaches a curb-side battery charging system that provides a mechanism for transferring electrical power to an electric vehicle to recharge its battery. The battery charging system includes a housing that is disposed on a wall, or is slidably attached to a track mounted to a ceiling, for example. A retractable charging device is coupled to a power supply, and mates with a receptacle device disposed in the vehicle. A variety of charging devices can be employed in the battery charging system. Electronic circuitry controls power supplied to the vehicle from the power supply of the charging system. In addition, an interface circuit allows a user to enter a code to use the system, and which provides an identification for billing purposes, or a credit card type key that activates the system and performs the same functions. A fan is provided for cooling purposes that causes an air flow through the system. The battery charging system allows an electric vehicle to be charged without any type of conventional electrical plug. The battery charging system provides a mechanism for coupling power from a power source to an electric vehicle to recharge its battery.

(2) U.S. Pat. No. 5,548,200 to Nor et al.

U.S. Pat. No. 5,548,200—issued to Nor et al. on Aug. 20, 1996 in U.S. class 320 and subclass 109—teaches a method and apparatus for charging the battery of an electric vehicle. When the electric vehicle is connected to a charging station, it is interrogated to determine the nature of the charge controller that is onboard the vehicle. Logic decisions invoking the particular mode for charging the vehicle are made depending on the nature and type of charge controller that is onboard the vehicle. Thus, delivery of charging energy to the battery in the vehicle may be entirely under the control of a charge controller onboard the vehicle, or if the control module in the vehicle is less sophisticated, then delivery of charging energy will be under the control of a charging module within the charging station. Parameters of initial charging current and voltage are therefore set either by the onboard battery charging controller or the charge controller in the charging station. Alternatively, these parameters may be set manually or by insertion of a card into a data interface to establish initial charging conditions. Under controlled conditions, a plurality of vehicles may be charged at a single establishment having a plurality of charging stations, either sequentially or simultaneously, depending on the criteria to be established. The charging station may be privately owned so as to charge a fleet of vehicles, or there may be a plurality of charging stations at a publicly accessible service station.

(3) U.S. Pat. No. 5,780,991 to Brake et al.

U.S. Pat. No. 5,780,991—issued to Brake et al. on Jul. 14, 1998 in U.S. class 320 and subclass 112—teaches a charging apparatus with multiple charge stations. The apparatus includes a single power supply that operates under the control of a microprocessor to charge a plurality of battery packs disposed in respective charging stations. Associated with each charging station is a wiring harness assembly that includes an EEPROM memory chip having one or more stored charging algorithms for the type or types of battery packs to be charged at that charging station. The microprocessor reads the charging algorithm from a charging station's memory chip when a battery pack is inserted in the charging station. The microprocessor utilizes a feedback control loop including a resistor network to regulate the charging current and charging voltage supplied to each battery pack being charged. If a plurality of Li-Ion battery packs are disposed in respective charging stations, each pack is sequentially charged so that the voltage across the pack is raised to the rated output voltage of the pack. Then, all of the Li-Ion battery packs are charged in parallel until each is fully charged. The parallel charging reduces total charging time.

(4) U.S. Pat. No. 5,803,215 to Henze et al.

U.S. Pat. No. 5,803,215—issued to Henze et al. on Sep. 8, 1998 in U.S. class 191 and subclass 2—teaches a method and apparatus for charging batteries of a plurality of vehicles, which includes a power source converter connectable to a power source to receive electrical power, and for converting the electrical power to a selected voltage potential that is distributed on a distribution bus. A plurality of vehicle connecting stations are connected to the distribution bus. Each vehicle connecting station includes a station power converter for receiving electrical power from the power source converter for charging the battery, and a station controller to control electrical power flow to the vehicle battery.

(5) U.S. Pat. No. 5,847,537 to Parmley, Sr.

U.S. Pat. No. 5,847,537—issued to Parmley, Sr. on Dec. 8, 1998 in U.S. class 320 and subclass 109—teaches a charging station system of electric vehicles, which includes a building containing charging equipment, and may provide other auxiliary services. The system includes a T-bar extending from the building to provide charging stalls or locations spaced along the T-bar. The building is modular, and incorporates a standard ISO type configuration.

(6) U.S. Pat. No. 6,081,205 to Williams.

U.S. Pat. No. 6,081,205—issued to Williams on Jun. 27, 2000 in U.S. class 340 and subclass 932.2—teaches an electric vehicle recharging parking meter that includes a parking meter, a processor, a display interconnected to the processor for giving visual information to a user, and an input device interconnected to the processor. The input device enables the user to select the parking time and/or the recharging time for the electric vehicle. The processor is responsive to the user selection of recharge time, parking time, and recharge power requirements entered on the input device. A payment receptor for receiving payment for the parking and recharge time selected by the user is interconnected to the processor for indicating receipt of payment for parking time and recharge electricity. The processor enables a switch to close so that power is supplied to the vehicle from a power source. A connector is attached to a post or stand on which the meter is mounted, whereby the electric vehicle is interconnected to the power source. A power controller, operable in response to signals from the processor, is interconnected between the power source and the connector.

(7) U.S. Pat. No. 6,338,450 to Schwendinger.

U.S. Pat. No. 6,338,450—issued to Schwendinger on Jan. 15, 2002 in U.S. class 242 and subclass 388.9—teaches a cable manager having a support member and a bracket that mounts the support member to a ceiling joist of a golf cart shed. A first pulley wheel attaches to the top end of the support member, and a second pulley wheel attaches to a pulley mounting bracket. A coil spring entrained about the first pulley wheel has one end attached to the pulley mounting bracket and the other end attached to the bottom end of the support member. The second pulley wheel is suspended at a lower elevation than the first pulley wheel, and moves down against the force of the spring when the power cable entrained over it is pulled down to connect to a golf cart for recharging. While recharging occurs, the lower pulley is fixed to the support member by attaching its bracket to an S-hook that attaches the spring to the vertical support member. When the power cable is released, the pulley moves up, but its upward travel is limited by a cable bracket that captures the power cable and holds it in position for easy retrieval for the next use. The cable manager is suspended from the ceiling, above the tops of the golf carts, leaving the area floor free of obstructions for the golf cart.

(8) United States Patent Application Publication Number 2008/0218121 to Gale et al.

United States Patent Application Publication Number 2008/0218121—published to Gale et al. on Sep. 11, 2008 in U.S. class 320 and subclass 109—teaches a method for charging an electric storage battery in a plug-in hybrid electric vehicle through a power supply circuit, which includes coupling the charger to the circuit, determining whether another appliance in the circuit other than the charger is drawing current, determining a maximum charge rate at which the battery can be charged using the charger, charging the battery at the maximum charge rate if no other appliance in the circuit is drawing current, and charging the battery at less than the maximum charge rate if another appliance in the circuit is drawing current.

It is apparent that numerous innovations for electric charging devices have been provided in the prior art, which are adapted to be used. Furthermore, even though these innovations may be suitable for the specific individual purposes to which they address, nevertheless, they would not be suitable for the purposes of the present invention as heretofore described, namely, a single electric vehicle charger for electrically, connecting to multiple electric vehicles simultaneously while automatically charging the multiple electric vehicles sequentially.

3. SUMMARY OF THE INVENTION

Thus, an object of the embodiments of the present invention is to provide a single electric vehicle charger for electrically connecting to multiple electric vehicles simultaneously while automatically charging the multiple electric vehicles sequentially in order to control electric consumption of the single electric vehicle charger to avoid exceeding electric service limitations feeding the single electric vehicle charger, which avoids the disadvantages of the prior art.

Thus, there exists a need for a smart system that enables one charger to sequentially charge multiple EVs in an automated manner. The charger would have multiple EVSE hoses and connectors capable of being simultaneously hooked up to several EVs. The smart system would insure that only one EV connector is energized at a time. In this way, multiple EVs would be parked and hooked up to an EVSE connector, and the EV operators can leave their EVs so they can be charged up at the appropriate time. By charging only one EV at a time, the EVSE's electric consumption would be controlled to avoid exceeding any electric service limitations, and the ratio of EVs charged per day to the number of EV chargers installed would improve resulting in better overall EVSE efficiency. By allowing for a single charger to connect to multiple EVs at once, while only charging one EV at a time, the cost of purchasing additional chargers is avoided, the cost of providing additional charging infrastructure is minimized, and a need for a parking garage attendant can at least be significantly reduced and in many cases eliminated. A switching mechanism allows the smart system to isolate all but one of the electrically connected EVs. Once the charging is complete for one EV, that EV is electrically isolated and the next EV to be charged is electrically connected. An electro/mechanical disconnect switch on each EV connection line electrically connects or isolates each EV from the EV charger to safely and reliably direct electrical output of the single electric vehicle charger into one of several electrically connected electric vehicles.

Briefly stated, another object of the embodiments of the present invention is to provide a single electric vehicle charger for electrically connecting to multiple electric vehicles simultaneously while automatically charging the multiple electric vehicles sequentially. The charger includes an AC to DC rectifier, at least one ground fault circuit interrupter, and at least two physical electrical disconnects. The AC to DC rectifier electrically connects to an AC power source and converts AC power to DC power so as to allow DC batteries of the multiple electric vehicles to be charged from the AC power source. The at least one ground fault circuit interrupter is in electrical communication with the AC to DC rectifier and disconnects whenever current becomes unbalanced between an energized conductor and a return neutral conductor. The at least two physical electrical disconnects are in electrical communication with the at least one ground fault circuit interrupter and isolate the multiple electric vehicles that are electrically connected but are not being charged, with only one physical electrical disconnect being closed at any given instant so as to allow for the electrically connecting to the multiple electric vehicles simultaneously while automatically charging the multiple electric vehicles sequentially.

The novel features considered characteristic of the embodiments of the present invention are set forth in the appended claims. The embodiments of the present invention themselves, however, both as to their construction and to their method of operation together with additional objects and advantages thereof will be best understood from the following description of specific embodiments of the present invention when read and understood in connection with the accompanying figures of the drawing.

4. BRIEF DESCRIPTION OF THE FIGURES OF THE DRAWING

The figures of the drawing are briefly described as follows.

5. LIST OF REFERENCE NUMERALS UTILIZED IN THE FIGURES OF THE DRAWING

A. General.
10 single electric vehicle charger of embodiments of present invention for electrically connecting to multiple electric vehicles 12 simultaneously while automatically charging multiple electric vehicles 12 sequentially
12 multiple electric vehicles
B. Configuration of First Embodiment of Single Electric Vehicle Charger 10.
14 AC to DC rectifier for electrically connecting to AC power source 20 and converting AC power to DC power so as to allow DC batteries of multiple electric vehicles 12 to be charged from AC power source 20
16 at least one ground fault circuit interrupter for disconnecting whenever current becomes unbalanced between energized conductor and return neutral conductor
18 at least two physical electrical disconnects for isolating multiple electric vehicles 12 that are electrically connected, but are not being charged, with only one physical electrical disconnect 18 being closed at any given instant so as to allow for electrically connecting to multiple electric vehicles 12 simultaneously while automatically charging multiple electric vehicles 12 sequentially
20 AC power source
22 at least two male electric vehicle connectors for engaging in multiple electric vehicles 12, respectively, to thereby connect single electric vehicle charger 10 to multiple electric vehicles 12
C. Configuration of Second Embodiment of Single Electric Vehicle Charger 50.
50 single electric vehicle charger
D. Configuration of Third Embodiment of Single Electric Vehicle Charger 100.
100 single electric vehicle charger
E. Configuration of Fourth Embodiment of Single Electric Vehicle Charger 150.
150 single electric vehicle charger

6. DETAILED DESCRIPTION OF THE PREFERRED EMBODIMENTS

A. General.

Figure 1:
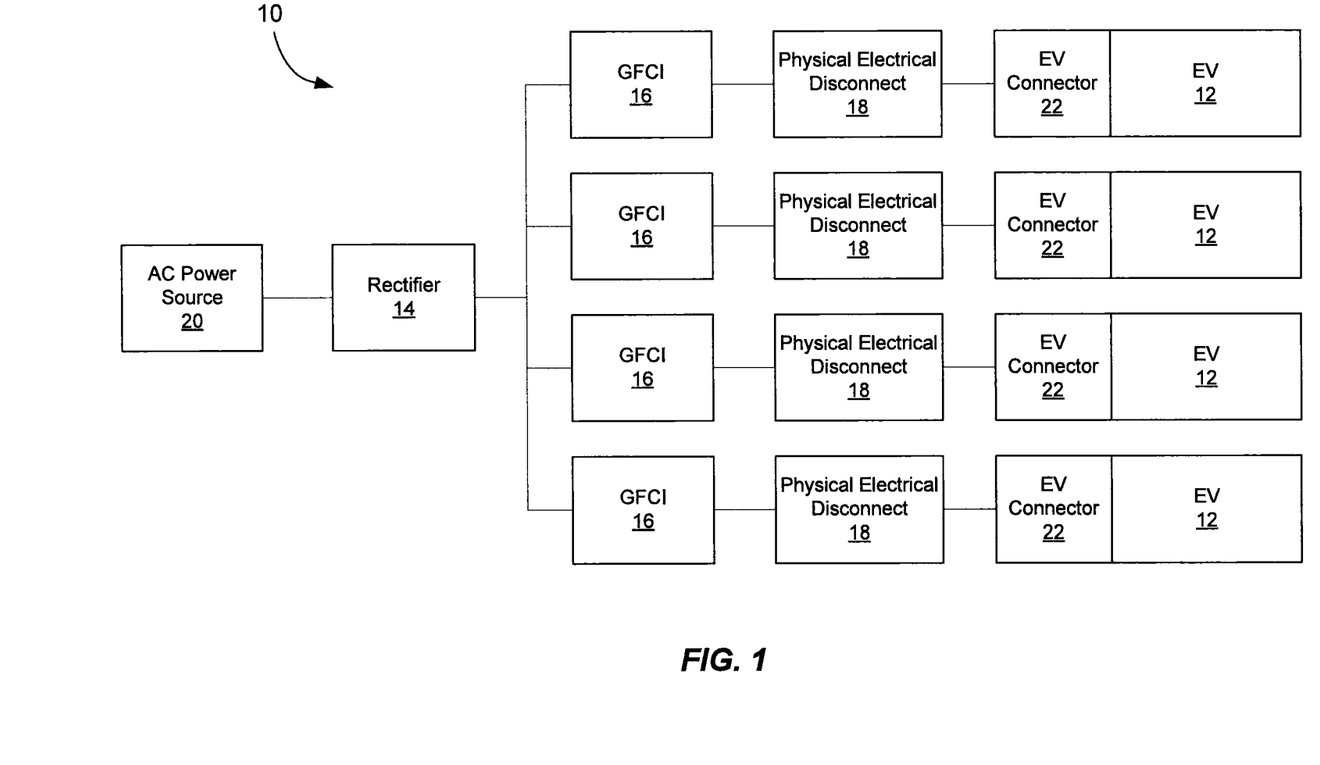
FIG. 1 is a diagrammatic schematic/block diagram of a first embodiment of the single electric vehicle charger of the embodiments of the present invention electrically connecting to multiple electric vehicles simultaneously while automatically charging the multiple electric vehicles sequentially.

Referring now to the figures, in which like numerals indicate like parts, and particularly to FIG. 1, which is a diagrammatic schematic/block diagram of a first embodiment of the single electric vehicle charger of the embodiments of the present invention electrically connecting to multiple electric vehicles simultaneously while automatically charging the multiple electric vehicles sequentially, a first embodiment of the single electric vehicle charger of the embodiments of the present invention is shown generally at 10 for electrically connecting to multiple electric vehicles 12 simultaneously while automatically charging the multiple electric vehicles 12 sequentially.

It is to be understood that there is no theoretical limit on the number of EVs that can potentially be connected at the same time to the single electric vehicle charger 10. The minimum number of EV connections, however, is 2.

The advantage of the single electric vehicle charger 10 is that it is a less expensive way to increase the number of the multiple electric vehicles 12 that can be charged in a given amount of time when compared to the cost of purchasing and installing additional single-service electric vehicle chargers. By using a common charger, with multiple connections, the cost of redundant components used in a multiple single source charger system is avoided.

Another significant advantage of the single electric vehicle charger 10 is an overall improvement in EVSE operational efficiency. This is accomplished by greatly reducing EVSE downtime, i.e., the time that elapses between charges. Physically relocating and reconnecting the multiple electric vehicles 12 is replaced with electrical switching. Hence, the time between charges will be drastically reduced. Therefore, the single electric vehicle charger 10 allows for charging more of the multiple electric vehicles 12 per day than by using a single charger. When compared to a system with multiple single chargers, the single electric vehicle charger 10 charges more of the multiple electric vehicles 12 per EV charger per day.

B. Configuration of the First Embodiment of the Single Electric Vehicle Charger 10.

The single electric vehicle charger 10 comprises an AC to DC rectifier 14, at least one ground fault circuit interrupter 16, and at least two physical electrical disconnects 18. The AC to DC rectifier 14 is for electrically connecting to an AC power source 20 and converting AC power to DC power so as to allow DC batteries of the multiple electric vehicles 12 to be charged from the AC power source 20. The at least one ground fault circuit interrupter 16 is in electrical communication with the AC to DC rectifier 14 and is for disconnecting whenever current becomes unbalanced between an energized conductor and a return neutral conductor. The at least two physical electrical disconnects 18 are in electrical communication with the at least one ground fault circuit interrupter 16 and are for isolating the multiple electric vehicles 12 that are electrically connected but are not being charged, with only one physical electrical disconnect 18 being closed at any given instant so as to allow for the electrically connecting to the multiple electric vehicles 12 simultaneously while automatically charging the multiple electric vehicles 12 sequentially.

The single electric vehicle charger 10 further comprises a centralized order and control algorithm. The centralized order and control algorithm is for determining an order in which the multiple electric vehicles 12 are to be charged, can be different for each location, and will be determined using specific factors, such as, for example, first in-first charged, elite members or frequent customers connected first, short parking duration customers charged first, etc.

The at least one ground fault circuit interrupter 16 is at least two ground fault circuit interrupters 16. The at least two ground fault circuit interrupters 16 are electrically connected to the AC to DC rectifier 14.

The at least two physical electrical disconnects 18 are electrically connected to the at least two ground fault circuit interrupters 16, respectively, so as to also be electrically connected to the AC to DC rectifier 14.

The single electric vehicle charger 10 further comprises at least two male electric vehicle connectors 22. The at least two male electric vehicle connectors 22 are electrically connected to the at least two physical electrical disconnects 18, respectively, and are for electrically engaging the multiple electric vehicles 12 to thereby electrically connect the single electric vehicle charger 10 to the multiple electric vehicles 12.

The at least two ground fault circuit interrupters 16 are electrically connected to, and between, the AC to DC rectifier 14 and the at least two physical electrical disconnects 18.

The at least two physical electrical disconnects 18 are electrically connected to, and between, the at least two ground fault circuit interrupters 16 and the at least two male electric vehicle connectors 22, respectively.

C. Configuration of the Second Embodiment of the Single Electric Vehicle Charger 50.

Figure 2:
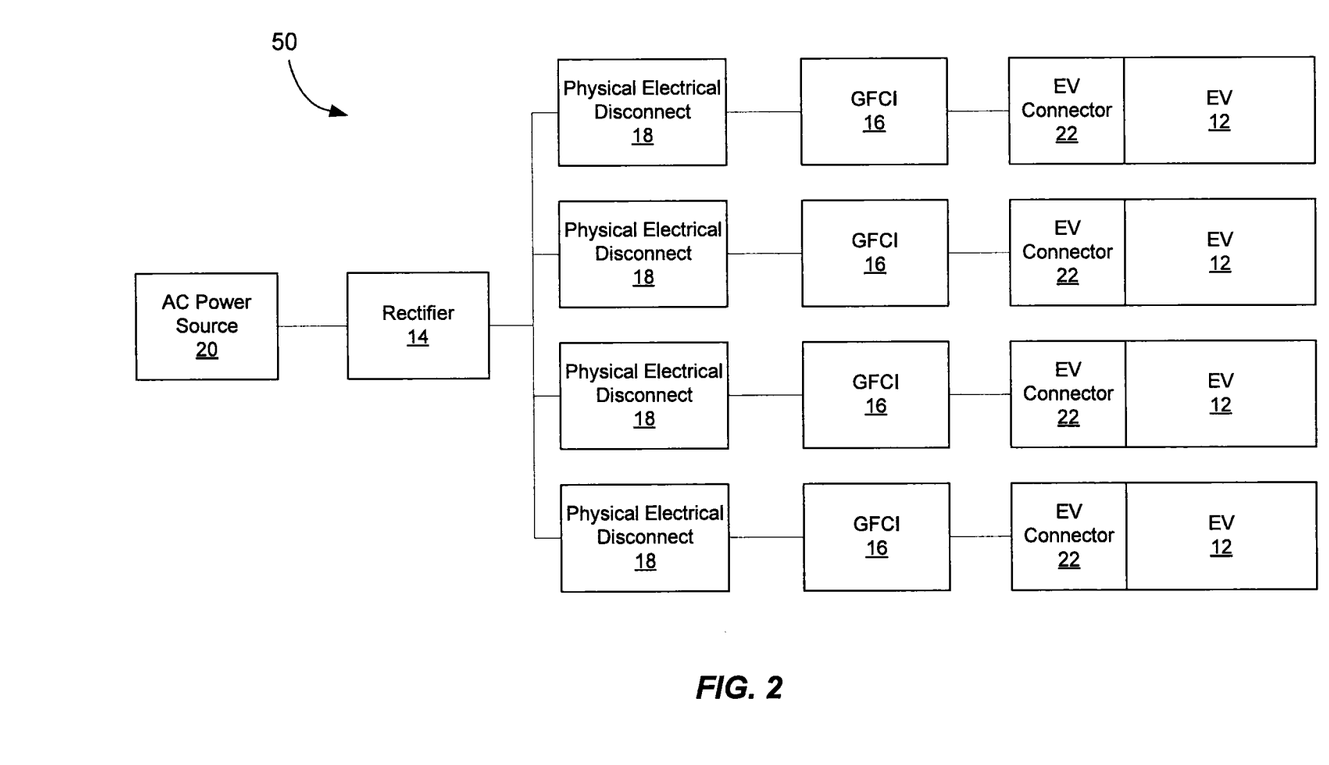
FIG. 2 is a diagrammatic schematic/block diagram of a second embodiment of the single electric vehicle charger of the embodiments of the present invention electrically connecting to multiple electric vehicles simultaneously while automatically charging the multiple electric vehicles sequentially.

The configuration of the second embodiment of the single electric vehicle charger 50 can best be seen in FIG. 2, which is a diagrammatic schematic/block diagram of a second embodiment of the single electric vehicle charger of the embodiments of the present invention electrically connecting to multiple electric vehicles simultaneously while automatically charging the multiple electric vehicles sequentially, and as such, will be discussed with reference thereto.

The single electric vehicle charger 50 is similar to the single electric vehicle charger 10, except that the at least two ground fault circuit interrupters 16 and the at least two physical electrical disconnects 18 are interchanged with each other, respectively, so that:

The at least two physical electrical disconnects 18 are electrically connected to, and between, the AC to DC rectifier 14 and the at least two ground fault circuit interrupters 16;

The at least two male electric vehicle connectors 22 are electrically connected to the at least two ground fault circuit interrupters 16, respectively; and The at least two ground fault circuit interrupters 16 are electrically connected to, and between, the at least two physical electrical disconnects 18 and the at least two male electric vehicle connectors 22, respectively.

D. Configuration of the Third Embodiment of the Single Electric Vehicle Charger 100.

Figure 3:
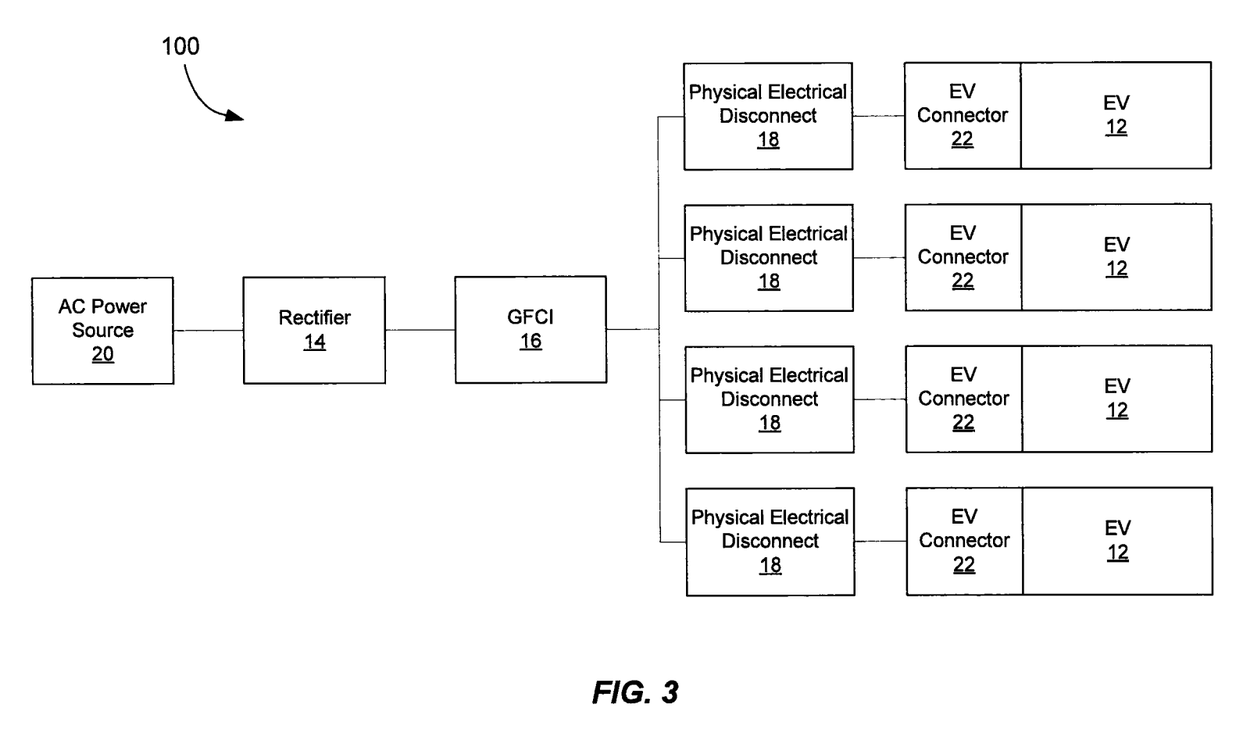
FIG. 3 is a diagrammatic schematic/block diagram of a third embodiment of the single electric vehicle charger of the embodiments of the present invention electrically connecting to multiple electric vehicles simultaneously while automatically charging the multiple electric vehicles sequentially.

The configuration of the third embodiment of the single electric vehicle charger 100 can best be seen in FIG. 3, which is a diagrammatic schematic/block diagram of a third embodiment of the single electric vehicle charger of the embodiments of the present invention electrically connecting to multiple electric vehicles simultaneously while automatically charging the multiple electric vehicles sequentially, and as such, will be discussed with reference thereto.

The at least one ground fault circuit interrupter 16 is one ground fault circuit interrupter 16. The one ground fault circuit interrupter 16 is electrically connected to the AC to DC rectifier 14 and to the at least two physical electrical disconnects 18.

The at least two physical electrical disconnects 18 are electrically connected to, and between, the one ground fault circuit interrupter 16 and the at least two male electric vehicle connectors 22 so as to also be electrically connected to the AC to DC rectifier 14.

The at least two male electric vehicle connectors 22 are electrically connected to the at least two physical electrical disconnects 18, respectively.

E. Configuration of the Fourth Embodiment of the Single Electric Vehicle Charger 150.

Figure 4:
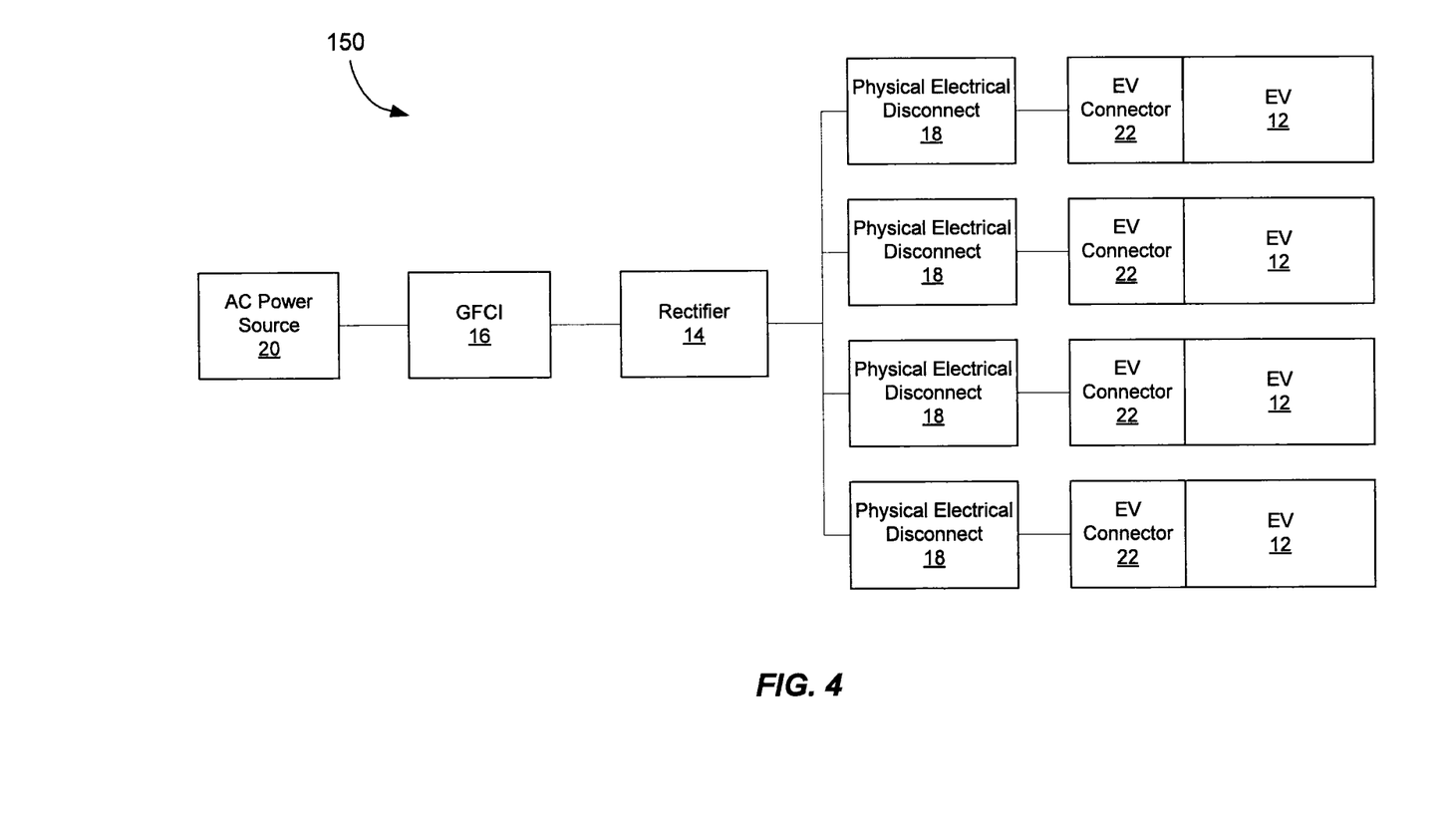
FIG. 4 is a diagrammatic schematic/block diagram of a fourth embodiment of the single electric vehicle charger of the embodiments of the present invention electrically connecting to multiple electric vehicles simultaneously while automatically charging the multiple electric vehicles sequentially.

The configuration of the fourth embodiment of the single electric vehicle charger 150 can best be seen in FIG. 4, which is a diagrammatic schematic/block diagram of a fourth embodiment of the single electric vehicle charger of the embodiments of the present invention electrically connecting to multiple electric vehicles simultaneously while automatically charging the multiple electric vehicles sequentially, and as such, will be discussed with reference thereto.

The single electric vehicle charger 150 is similar to the single electric vehicle charger 100, except that the AC to DC rectifier 14 and the one ground fault circuit interrupter 16 are interchanged with each other so that:

The one ground fault circuit interrupter 16 is for electrically connecting to the AC power source 20;

The one ground fault circuit interrupter 16 is electrically connected to the AC to DC rectifier 14 and to the at least two physical electrical disconnects 18;

The at least two physical electrical disconnects 18 are electrically connected to, and between, the AC to DC rectifier 14 and the at least two male electric vehicle connectors 22, respectively; and The at least two male electric vehicle connectors 22 are electrically connected to the at least two physical electrical disconnects 18, respectively.

F. Impressions.

It will be understood that each of the elements described above or two or more together may also find a useful application in other types of constructions differing from the types described above.

While the embodiments of the present invention have been illustrated and described as embodied in a single electric vehicle charger for electrically connecting to multiple electric vehicles simultaneously while automatically charging the multiple electric vehicles sequentially, nevertheless, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A single electric vehicle charger for electrically connecting to multiple electric vehicles simultaneously while automatically charging the multiple electric vehicles sequentially in order to control electric consumption of the single electric vehicle charger to avoid exceeding electric service limitations feeding the single electric vehicle charger, the single electric vehicle charger comprising:
an AC to DC rectifier;
at least two ground fault circuit interrupters; and
at least two physical electrical disconnects;
wherein said AC to DC rectifier is for electrically connecting to an AC power source;
wherein said AC to DC rectifier is for converting AC power to DC power so as to allow DC batteries of the multiple electric vehicles to be charged from the AC power source;
wherein said at least two ground fault circuit interrupters are in electrical communication with said AC to DC rectifier;
wherein said at least two ground fault circuit interrupters are for disconnecting whenever current becomes unbalanced between an energized conductor and a return neutral conductor;
wherein said at least two physical electrical disconnects are in electrical communication with said at least two ground fault circuit interrupters; and
wherein said at least two physical electrical disconnects are for isolating the multiple electric vehicles that are electrically connected but are not being charged, with only one physical electrical disconnect being closed at any given instant so as to allow for the electrically connecting to the multiple electric vehicles simultaneously while automatically charging the multiple electric vehicles sequentially in order to control the electric consumption of the single electric vehicle charger to avoid exceeding the electric service limitations feeding said single electric vehicle charger.

2. The charger of claim 1, further comprising at least two male electric vehicle connectors; and
wherein said at least two male electric vehicle connectors are for electrically engaging the multiple electric vehicles, respectively, to thereby electrically connect said single electric vehicle charger to the multiple electric vehicles.

3. The charger of claim 2, further comprising a centralized order and control algorithm; and
wherein said centralized order and control algorithm is for determining an order in which the multiple electric vehicles are to be charged.

4. The charger of claim 1, wherein said at least two ground fault circuit interrupters are electrically connected to said AC to DC rectifier.

5. The charger of claim 4, wherein said at least two physical electrical disconnects are electrically connected to said at least two ground fault circuit interrupters, respectively, so as to also be electrically connected to said AC to DC rectifier.

6. The charger of claim 5, wherein said at least two male electric vehicle connectors are electrically connected to said at least two physical electrical disconnects, respectively.

7. The charger of claim 6, wherein said at least two ground fault circuit interrupters are electrically connected to, and between, said AC to DC rectifier and said at least two physical electrical disconnects, respectively.

8. The charger of claim 7, wherein said at least two physical electrical disconnects are electrically connected to, and between, said at least two ground fault circuit interrupters and said at least two male electric vehicle connectors, respectively.

9. The charger of claim 1, wherein said at least two physical electrical disconnects are electrically connected to, and between, said AC to DC rectifier and said at least two ground fault circuit interrupters, respectively.

10. The charger of claim 9, wherein said at least two male electric vehicle connectors are electrically connected to said at least two ground fault circuit interrupters, respectively; and
wherein said at least two male electric vehicle connectors are for electrically engaging to said multiple electric vehicles, respectively, to thereby electrically connect said single electric vehicle charger to said multiple electric vehicles.

11. The charger of claim 10, wherein said at least two ground fault circuit interrupters are electrically connected to, and between, said at least two physical electrical disconnects and said at least two male electric vehicle connectors, respectively.

12. The charger of claim 3, wherein said at least two ground fault circuit interrupters are for electrically connecting to the AC power source.

13. The charger of claim 12, wherein said at least two ground fault circuit interrupters are electrically connected to said AC to DC rectifier and to said at least two physical electrical disconnects.

14. The charger of claim 13, wherein said at least two physical electrical disconnects are electrically connected to, and between, said AC to DC rectifier and said at least two male electric vehicle connectors, respectively.

15. The charger of claim 14, wherein said at least two male electric vehicle connectors are electrically connected to said at least two physical electrical disconnects, respectively; and wherein said at least two male electric vehicle connectors are for electrically engaging the multiple electric vehicles to thereby electrically connect said single electric vehicle charger to the multiple electric vehicles.

* * * * *